United States Patent
Zhang et al.

(10) Patent No.: US 8,236,883 B2
(45) Date of Patent: Aug. 7, 2012

(54) PUNCTURE-RESISTANT BULLETPROOF AND LEAKPROOF SAFETY TIRE AND ITS PREPARATION METHOD, AND A LEAKPROOF AND HERMETICALLY-REPAIRING MACROMOLECULAR MATERIAL UTILIZED IN THE METHOD

(76) Inventors: Hailong Zhang, Shanghai (CN); Donghua Hu, Shanghai (CN)

( * ) Notice: Subject to any disclaimer, the term of this patent is extended or adjusted under 35 U.S.C. 154(b) by 1239 days.

(21) Appl. No.: 12/008,621

(22) Filed: Jan. 11, 2008

(65) Prior Publication Data

US 2010/0116398 A1 May 13, 2010

(30) Foreign Application Priority Data

Jan. 12, 2007 (CN) .......................... 2007 1 0036418

(51) Int. Cl.
    *C08K 5/00* (2006.01)
    *B29C 73/00* (2006.01)
(52) U.S. Cl. ....................... 524/287; 523/166
(58) Field of Classification Search .................... 524/287
    See application file for complete search history.

(56) References Cited

U.S. PATENT DOCUMENTS

| | | | | |
|---|---|---|---|---|
| 3,903,947 A | * | 9/1975 | Emerson | 152/504 |
| 4,772,031 A | * | 9/1988 | Poppo | 277/316 |
| 5,777,043 A | * | 7/1998 | Shafer et al. | 525/339 |

FOREIGN PATENT DOCUMENTS

| | | |
|---|---|---|
| CN | ZL 00213646.5 | 1/2001 |
| CN | 1303409 A | 7/2001 |
| CN | ZL 02240949.1 | 8/2003 |
| CN | ZL 2004045236.9 | 6/2005 |
| CN | 1803482 A | 7/2006 |
| WO | WO 99/62998 | 12/1999 |

* cited by examiner

*Primary Examiner* — Ling Choi
*Assistant Examiner* — Hui Chin
(74) *Attorney, Agent, or Firm* — McCracken & Frank LLC

(57) ABSTRACT

The present disclosure provides a safety tire having a puncture-resistant, bulletproof, and leakproof capability between about −45° C. to about 120° C. without any damaging process to the inside wall of the tire, but just by spray coating a layer of leakproof and hermetically-repairing macromolecular material with a thickness of about 2 mm to about 8 mm to the inside wall of the tire that does not have an inner tube. The present disclosure also provides the components of the leakproof and hermetically-repairing macromolecular material and the method to prepare the puncture-resistant bulletproof and leakproof safety tires.

8 Claims, 4 Drawing Sheets

PUNCTURE-RESISTANT BULLETPROOF AND LEAKPROOF SAFETY TIRE AND ITS PREPARATION METHOD, AND A LEAKPROOF AND HERMETICALLY-REPAIRING MACROMOLECULAR MATERIAL UTILIZED IN THE METHOD

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

This invention relates to a puncture-resistant, bulletproof, and leakproof safety tire and its preparation method, and a leakproof and hermetically-repairing macromolecular material utilized in the method.

2. Description of the Background of the Invention

At present, tires are classified to two kinds: tires including an inner tube and tires not including an inner tube. Presently, the tires not including an inner tube are utilized in most vehicles for riding and it is also promotionally introduced to be utilized in the cargo truck under the call of the government. The tires not including an inner tube possess excellent heat-sinking capability, ductility, amenity, airtightness, and long-spacing interval for using between two times of charging. However, if a tire without an inner tube is pierced by a pointed object, in short time, the gas pressure in the tire will leak through the pierced hole slowly, while the pointed object stays in the tire and air will leak fast after the pointed object sheds from the tire. The result caused by that situation in high-speed driving is unpredictable.

Some methods to prevent danger caused by gas leakage of tires after puncture have been reported, mainly including:

One known method provides a kind of tire comprised of a tire body and a pattern on the tire body, wherein there is a layer consisting of ceramic, fabric cloth, and epikote composite on tire body and the pattern.

Another known method provides a kind of structure-modified explosion-proof tire comprised of tread, an inner tube, and leakproof liquid. The leakproof liquid is filled in the seal part of the inner edge of the inner tube to prevent leakage.

Yet another known method provides a kind of tire without an inner tube that is exempt from repair, having a leakproof layer of silica gel or silicone glass cement adhered to the inner surface of the tire. There is also a pressure-equalizing layer on the leakproof layer.

Another known method provides a kind of styrene-isoprene composite leakproof layer and processes to get certain roughness by cutting, sanding, knife-scraping and so on, which have certain damaging effects to the tire. As a result of this process, the tire becomes unsafe.

Another known method provides a kind of puncture-proof tire composite comprised of the following parts by weight of materials: 100 parts of thermoplastic elastomer containing styrene group, 110~190 parts of binder, 80~140 parts of liquid plasticizing agent and 2~20 parts of addition agent. Because the content of the liquid plasticizing agent is higher than 20%, the composite possesses strong flowing power. During high speed driving, the composite will flow to the center part of the tire rim under centrifugal force, which will cause imbalance of the tire and the tire edge will puncture. As a result, gas leakage will happen. Otherwise, this method does not solve the high-temperature and low-temperature resistant problem of tires.

The aforementioned methods are directed to leakproof problems in tires, however lots of shortcomings exist. Tire products look simple, but are complicated in fact and have a high technological requirement because it is the basic guarantee of vehicle-driving safety. Furthermore, tires are required to pass the test of working in large temperature differences and under load-bearing stress for a long time. Especially, tires are required to have a much higher safety index of dynamic balance, high speed, persistence and so on. Tires must bear low-temperatures of −45° C. and gas leakage must not happen after being punctured while high-speed driving, even after driving a long-time at a high-temperature, for example, even at about 120° C. However, the aforementioned methods can not satisfy these requirements, or the tires lose their leakproof capability because the leakproof layer is shed off from the tires after the adhesion between the leakproof layer and the tire becomes loose, which is caused by the leakproof layer aging in these methods.

SUMMARY OF THE INVENTION

The purpose of this invention is to solve the problem that present tires can't resist high temperatures, low temperatures, and long-time utilization and not have good dynamic balance, to provide a kind of puncture-resistant bulletproof and leakproof safety tire and its preparation method, and a kind of leakproof and hermetically-repairing macromolecular material utilized in the method.

According to one aspect of the present application, a puncture-resistant, bulletproof, and leakproof safety tire includes a puncture-resistant, bulletproof, and leakproof capability between about −45° C. to about 120° C. without any damaging process to the inside wall of the tire. The tire is spray coated with a layer of leakproof hermetically-repairing and elastic macromolecular colloid with a thickness of about 2 mm to about 8 mm to the inside wall of the tire without an inner tube.

According to another aspect of the present application, a method for preparing a puncture-resistant, bulletproof, and leakproof safety tire includes the steps of washing a half-finished master tire at a medium temperature to make the inside wall of the master tire satisfy the cohesion requirement of spray coating, putting the master tire into a drying room or a drying channel at a constant temperature of about 50° C. to about 80° C. for about 2 to about 8 hours according to the different kinds of the tires, mixing the components following their proportion at a temperature of about 170° C. to about 320° C. for about 0.5 hours to about 3 hours to prepare the leakproof hermetically-repairing and elastic macromolecular colloid, and coating the prepared leakproof hermetically-repairing and elastic macromolecular colloid in the fused phase to the inside wall of the tire without an inner tube by high-pressure spray coating or knife coating.

According to yet another aspect of the present application, a leakproof and hermetically-repairing macromolecular material applied in the preparation of the puncture-resistant bulletproof and leakproof safety tire includes about 42% to about 62% by weight of an elastic material, about 34% to about 54% by weight of a tackifier, about 3% to about 8% by weight of a softener, about 0.5% to about 1.5% by weight of an anti-aging agent, about 0% to about 3% by weight of a vesicant, about 0% to about 15% by weight of a bulking agent, and about 0% to about 1% by weight of a cross-linking agent.

Illustratively, some advantages of this invention include in some embodiments: (1) the puncture-resistant bulletproof and leakproof tire possesses puncture-resistant bulletproof and leakproof capability between about −45° C. to about 120° C., and (2) after being punctured by pointed object or shot through by bullet, the puncture-resistant bulletproof and leakproof safety tire can maintain high-speed operation over a long distance without gas leakage. It possesses excellent persistence and dynamic balance.

Other aspects and advantages of the present application will become apparent upon consideration of the following detailed description and the attached drawings.

DETAILED DESCRIPTION

Figure 1A:
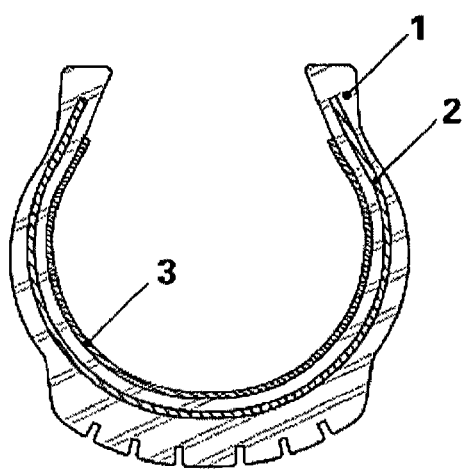
FIG. 1 shows three types of the inner wall structures of the puncture-resistant, bulletproof, and leakproof safety tire of this invention.
Figure 1B:
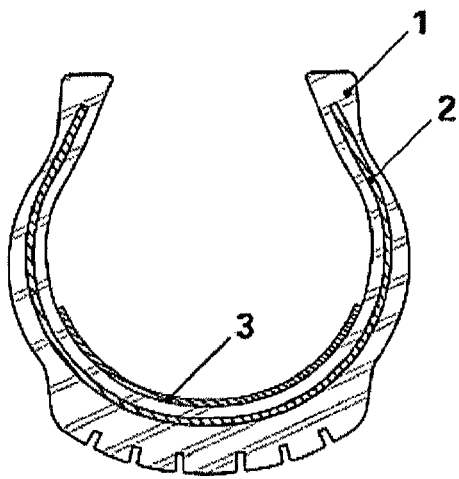
Figure 1C:
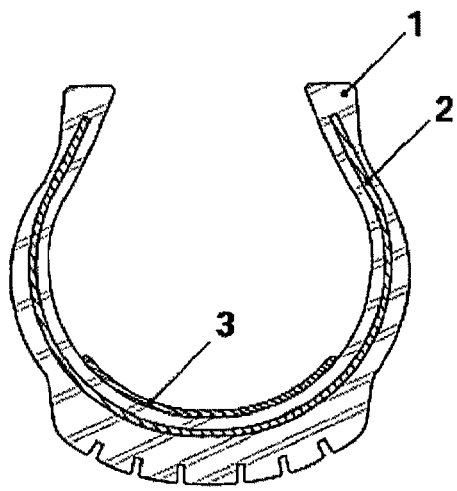
Figure 2A:
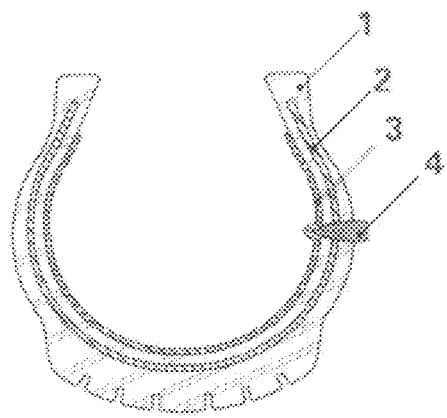
FIG. 2 is the schematic plan showing that after the sidewall of the tire is shot through by a bullet, the puncture-resistant bulletproof and leakproof safety tire of this invention still work in a normal way.
Figure 2B:
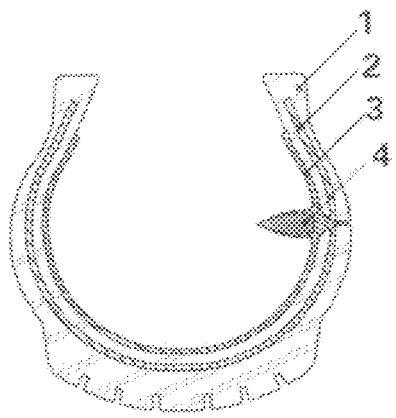
Figure 2C:
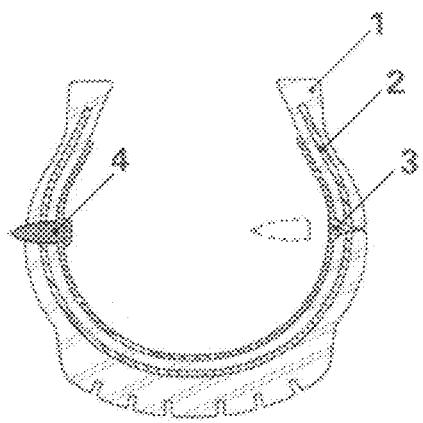
Figure 2D:
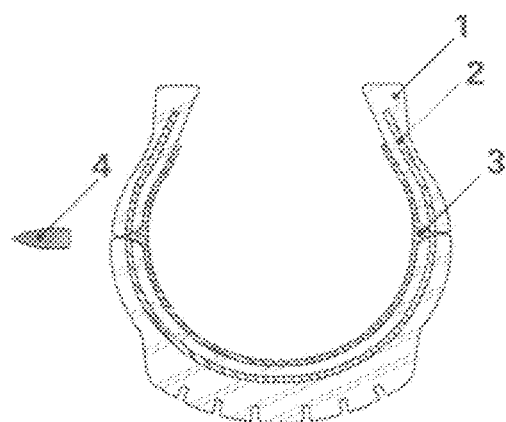
Figure 3A:
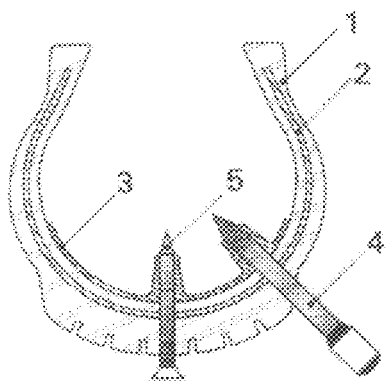
FIG. 3 is the schematic plan showing that after the sidewall and tread of the tire is punctured by relatively long, thick and pointed objects (big screwdriver), the puncture-resistant bulletproof and leakproof safety tire of this invention still work in a normal way.
Figure 3B:
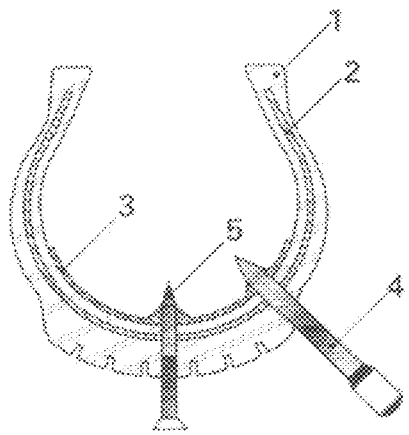
Figure 3C:
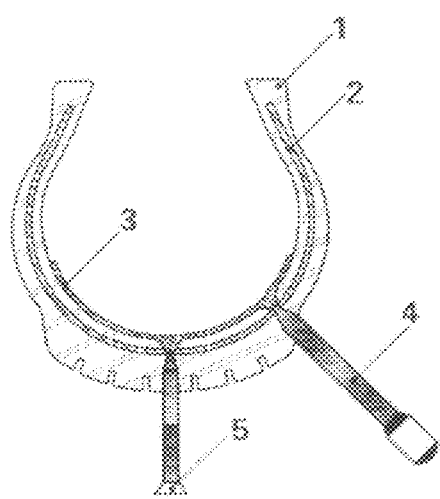
Figure 3D:
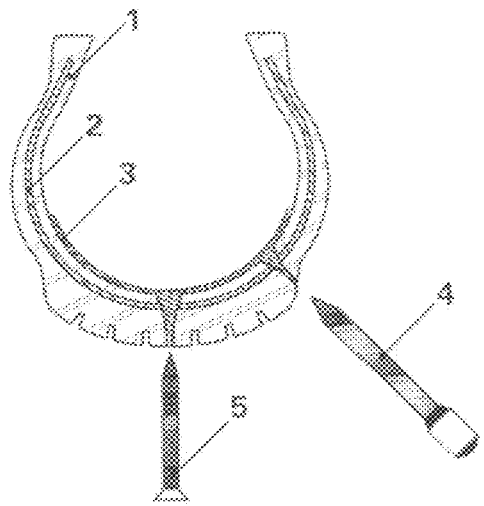
Figure 4A:
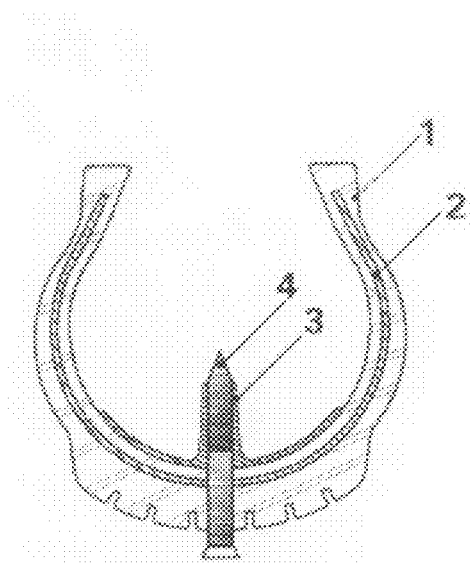
FIG. 4 is the schematic plan showing that after the tread of the tire is punctured by an iron nail, the puncture-resistant bulletproof and leakproof safety tire of this invention still work in a normal way.
Figure 4B:
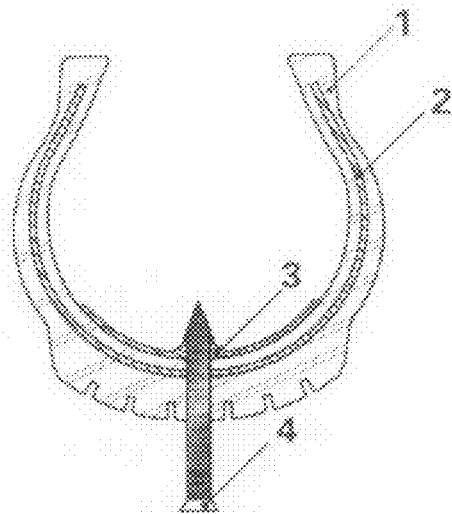
Figure 4C:
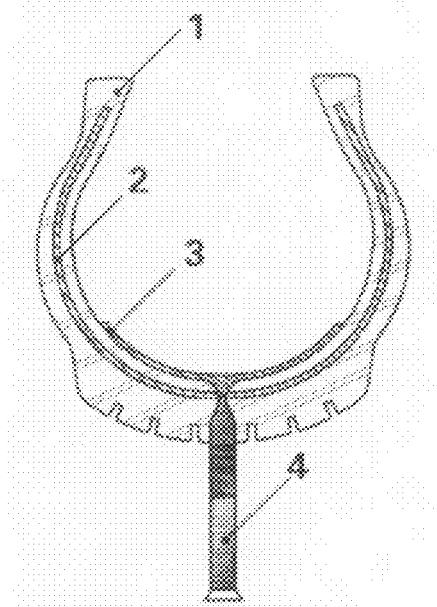
Figure 4D:
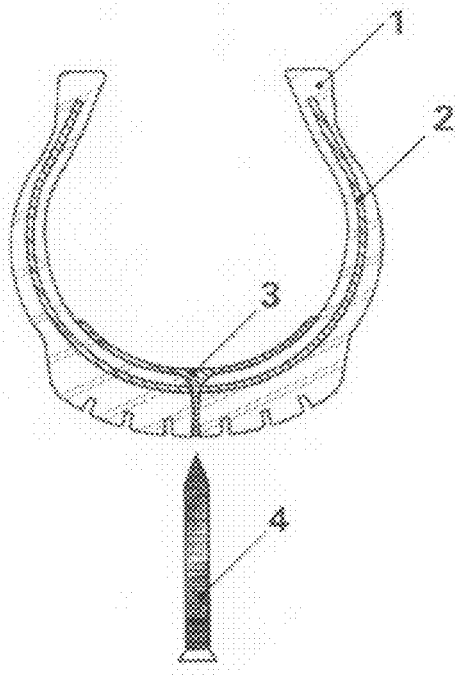

The following examples are used to further explain this invention, but not to restrict the scope of this invention.

Example 1

The components and their proportion of the leakproof and hermetically-repairing macromolecular material utilized for the preparation of the puncture-resistant bulletproof and leakproof tire (100% by weight is taken as standard): 48% elastic material, 40% tackifier, 8% softener, 3% bulking agent and 1% anti-aging agent. The aforementioned components were mixed following their proportion (shown in Table 1) at a temperature of 210° C. for 1 hour, then the prepared fused product was coated to the inside wall of the tire that did not have an inner tube by high-pressure spray coating (with a thickness of 2 mm) and a first embodiment of a puncture resistant bulletproof and leakproof safety tire was prepared.

TABLE 1

| Material | Name | Producer | proportion by weight (%) |
|---|---|---|---|
| elastic material | SIS | Kraton polymers | 33 |
|  | SEBS | Kraton polymers | 15 |
| tackifier | terpene resin- | Jiangsu Dongtai Yaerda Chemical Ltd. | 30 |

TABLE 1-continued

| Material | Name | Producer | proportion by weight (%) |
|---|---|---|---|
|  | petroleum resin | Shanghai Jinsen Petroleum Resin Ltd. | 10 |
| softener | naphthenic oil | Shanghai Jinhai Special Lubricant Plant | 6 |
|  | DBP | Jinzhou Petrochemical Corporation Chemical Plant No. 2 | 2 |
| bulking agent | nanophase lime carbonate | Shanghai Gerunya Nanophase Material Ltd. | 3 |
| anti-aging agent | Anti-aging Agent 1010 | Ciba specialty chemicals | 0.5 |
|  | Anti-aging Agent 1076 | Ciba specialty chemicals | 0.5 |

Example 2

Military and Civilian Special Type

The components and their proportion of the leakproof and hermetically-repairing macromolecular material utilized for the preparation of the Military and Civilian Special Type of tire (100% by weight is taken as standard): 50% elastic material, 37% tackifier, 2% vesicant, 7% softener, 2% bulking agent, 1% anti-aging agent and 1% cross-linking agent. The aforementioned components were mixed following their proportion (shown in Table 2) at a temperature of 250° C. for 1.5 hours, then the prepared fused product was coated to the inside wall of the tire without an inner tube by high-pressure spray coating (with a thickness of 2 mm) and another of a puncture-resistant bulletproof and leakproof safety tire was prepared.

TABLE 2

| Material | Name | Producer | proportion by weight (%) |
|---|---|---|---|
| elastic material | SIS | Kraton polymers | 40 |
|  | high styrene rubber | Lanzhou Petrochemical Branch Latex Research Center | 5 |
|  | native rubber | Hainan East Road Farm | 5 |
| tackifier | terpene resin | Jiangsu Dongtai Yaerda Chemical Ltd. | 22 |
|  | hydrogenated petroleum resin | Nanjing Yangzi Eastman Chemical Ltd. | 15 |
| vesicant | Vesicant OBSH | Kaifeng Dongda Chemical (Group) Ltd. | 2 |
| softener | DBP | Jinzhou Petrochemical Corporation Chemical Plant No. 2 | 7 |
| bulking agent | nanophase lime carbonate | Shanghai Gerunya Nanophase Material Ltd. | 2 |
| anti-aging agent | Anti-aging Agent 1010 | Ciba specialty chemicals | 1 |
| cross-linking agent | zinc oxide | Liaoning Cucurbit Island Zinc Plant | 1 |

Example 3

Military and Civilian Common Type

The components and their proportion of the leakproof and hermetically-repairing macromolecular material utilized for the preparation of the Military and Civilian Common Type of tire (100% by weight is taken as standard): 49% elastic material, 40% tackifier, 5% softener, 2% vesicant, 3% bulking agent and 1% anti-aging agent. The aforementioned components were mixed following their proportion (shown in Table 3) at temperature of 200° C. for 2 hours, then the prepared fused product was coated to the inside wall of the tire without an inner tube by high-pressure spray coating (with a thickness of 2 mm) and another embodiment of a puncture-resistant bulletproof and leakproof safety tire was prepared.

TABLE 3

| Material | Name | Producer | proportion by weight (%) |
|---|---|---|---|
| elastic material | SIS | Kraton polymers | 29 |
| | SEBS | Kraton polymers | 20 |
| tackifier | hydrogenated petroleum resin | Nanjing Yangzi Eastman Chemical Ltd. | 25 |
| | glycerol ester of rosin | Shanghai Nanda Chemical Plant | 13 |
| | petroleum resin | Shanghai Nanda Chemical Plant | 2 |
| softener | naphthenic oil | Shanghai Jinhai Special Lubricant Plant | 5 |
| vesicant | OBSH | Kaifeng Dongda Chemical (Group) Ltd. | 2 |
| bulking agent | nanophase lime carbonate | Shanghai Gerunya Nanophase Material Ltd. | 3 |
| anti-aging agent | Anti-aging Agent 1010 | Ciba specialty chemicals | 0.5 |
| | Anti-aging Agent 1076 | Ciba specialty chemicals | 0.5 |

Example 4

Trunk Type

The components and their proportion of the leakproof and hermetically-repairing macromolecular material utilized for the preparation of the Trunk Type of tire (100% by weight is taken as standard): 45% elastic material, 43% tackifier, 5% bulking agent, 6% softener and 1% anti-aging agent. The aforementioned components were mixed following their proportion (shown in Table 4) at temperature of 190° C. for 2.5 hours, then the prepared fused product was coated to the inside wall of the tire without an inner tube by knife coating (with a thickness of 6 mm) and another embodiment of a puncture-resistant bulletproof and leakproof safety tire was prepared.

TABLE 4

| Material | Name | Producer | proportion by weight (%) |
|---|---|---|---|
| elastic material | SIS | Kraton polymers | 30 |
| | SEBS | Kraton polymers | 15 |
| tackifier | terpene resin | Jiangsu Dongtai Yaerda Chemical Ltd. | 23 |
| | hydrogenated petroleum resin | Nanjing Yangzi Eastman Chemical Ltd. | 20 |
| bulking agent | nanophase lime carbonate | Shanghai Gerunya Nanophase Material Ltd. | 5 |
| softener | naphthenic oil | Shanghai Jinhai Special Lubricant Plant | 4 |

TABLE 4-continued

| Material | Name | Producer | proportion by weight (%) |
|---|---|---|---|
| | DBP | Jinzhou Petrochemical Corporation Chemical Plant No. 2 | 2 |
| anti-aging agent | anti-aging agent1010 | Ciba specialty chemicals | 0.5 |
| | anti-aging agent1076 | Ciba specialty chemicals | 0.5 |

Example 5

Light and Motorcycle Type

The components and their proportion of the leakproof and hermetically-repairing macromolecular material utilized for the preparation of the Light and Motorcycle Type of tire (100% by weight is taken as standard): 48% elastic material, 45% tackifier, 6% softener and 1% anti-aging agent. The aforementioned components were mixed following their proportion (shown in Table 5) at a temperature of 170° C. for 1 hour, then the prepared fused product was coated to the inside wall of the tire without an inner tube by knife coating (with a thickness of 6 mm) and yet another embodiment of the puncture-resistant bulletproof and leakproof safety tire was prepared.

TABLE 5

| Material | Name | Producer | proportion by weight (%) |
|---|---|---|---|
| elastic material | SIS | Kraton polymers | 48 |
| tackifier | glycerol ester of rosin | Shanghai Nanda Chemical Plant | 20 |
| | petroleum resin | Shanghai Jinsen Petroleum Resin Ltd. | 25 |
| softener | naphthenic oil | Shanghai Jinhai Special Lubricant Plant | 6 |
| anti-aging agent | anti-aging agent1010 | Ciba specialty chemicals | 1 |

Example 6

The components and their proportion of the leakproof and hermetically-repairing macromolecular material utilized for the preparation of the puncture-resistant bulletproof and leakproof tire (100% by weight is taken as standard): 43% elastic material, 53% tackifier, 3% softener and 1% anti-aging agent. The aforementioned components were mixed following their proportion (shown in Table 6) at a temperature of 180° C. for 3 hours, then the prepared fused product was coated to the inside wall of the tire without an inner tube by high-pressure spray coating (with a thickness of 2 mm) and yet another embodiment of the puncture-resistant bulletproof and leakproof safety tire was prepared.

TABLE 6

| Material | Name | Producer | proportion by weight (%) |
|---|---|---|---|
| elastic material | SIS | Kraton polymers | 43 |

TABLE 6-continued

| Material | Name | Producer | proportion by weight (%) |
|---|---|---|---|
| tackifier | petroleum resin | Shanghai Jinsen Petroleum Resin Ltd. | 53 |
| softener | naphthenic oil | Shanghai Jinhai Special Lubricant Plant | 3 |
| anti-aging agent | anti-aging agent1010 | Ciba specialty chemicals | 1 |

Example 7

The components and their proportion of the leakproof and hermetically-repairing macromolecular material utilized for the preparation of the puncture-resistant bulletproof and leakproof tire (100% by weight is taken as standard): 62% elastic material, 34% tackifier, 3.5% softener and 0.5% anti-aging agent. The aforementioned components were mixed following their proportion (shown in Table 7) at a temperature of 320° C. for 1.5 hours, then the prepared fused product was coated to the inside wall of the tire without an inner tube by knife coating (with a thickness of 5 mm) and yet another embodiment of the puncture-resistant bulletproof and leakproof safety tire was prepared.

TABLE 7

| Material | Name | Producer | proportion by weight (%) |
|---|---|---|---|
| elastic material | native rubber | Hainan East Road Farm | 62 |
| tackifier | glycerol ester of rosin | Shanghai Nanda Chemical Plant | 34 |
| softener | aromatic oil | Jinzhou Petrochemical Ltd. | 3.5 |
| anti-aging agent | Anti-aging Agent R D | Nanjing Chemical Plant | 0.5 |

Example 8

The components and their proportion of the leakproof and hermetically-repairing macromolecular material utilized for the preparation of the puncture-resistant bulletproof and leakproof tire (100% by weight is taken as standard): 52% elastic material, 43.5% tackifier, 3% softener and 1.5% anti-aging agent. The aforementioned components were mixed following their proportion (shown in Table 8) at a temperature of 300° C. for 1.5 hours, then the prepared fused product was coated to the inside wall of the tire without an inner tube by knife coating (with a thickness of 7 mm) and another embodiment of the puncture-resistant bulletproof and leakproof safety tire was prepared.

TABLE 8

| Material | Name | Producer | proportion by weight (%) |
|---|---|---|---|
| elastic material | polyisoprene rubber | Shanghai Weixin Chemical Ltd. | 52 |
| tackifier | terpene resin | Jiangsu Dongtai Yaerda Chemical Ltd. | 43.5 |
| softener | DBP | Jinzhou Petrochemical Corporation Chemical Plant No. 2 | 3 |

TABLE 8-continued

| Material | Name | Producer | proportion by weight (%) |
|---|---|---|---|
| anti-aging agent | Anti-aging Agent 1076 | Ciba specialty chemicals | 1.5 |

Example 9

The components and their proportion of the leakproof and hermetically-repairing macromolecular material utilized for the preparation of the puncture-resistant bulletproof and leakproof tire (100% by weight is taken as standard): 53% elastic material, 38% tackifier, 8% softener, 1% anti-aging agent and 1% cross-linking agent. The aforementioned components were mixed following their proportion (shown in Table 9) at a temperature of 280° C. for 2 hours, then the prepared fused product was coated to the inside wall of the tire without an inner tube by high-pressure spray coating (with a thickness of 3 mm) and another embodiment of the puncture-resistant bulletproof and leakproof safety tire was prepared.

TABLE 9

| Material | Name | Producer | proportion by weight (%) |
|---|---|---|---|
| elastic material | SEBS | Kraton polymers | 53 |
| tackifier | hydrogenated petroleum resin | Nanjing Yangzi Eastman Chemical Ltd. | 38 |
| softener | DEP | Shanghai Jinwei Chemical Ltd. | 8 |
| anti-aging agent | anti-aging agent4010NA | Nanjing Chemical Plant | 1 |

Example 10

The components and their proportion of the leakproof and hermetically-repairing macromolecular material utilized for the preparation of the puncture-resistant bulletproof and leakproof tire (100% by weight is taken as standard): 45% elastic material, 46.2% tackifier, 5% softener, 3% vesicant and 0.8% anti-aging agent. The aforementioned components were mixed following their proportion (shown in Table 10) at a temperature of 200° C. for 2 hours, then the prepared fused product was coated to the inside wall of the tire without an inner tube by knife coating (with a thickness of 6 mm) and another embodiment of the puncture-resistant bulletproof and leakproof safety tire was prepared.

TABLE 10

| Material | Name | Producer | proportion by weight (%) |
|---|---|---|---|
| elastic material | high styrene rubber | Lanzhou Petrochemical Branch Latex Research Center | 45 |
| tackifier | abietic acid pentaerythritol ester | Shanghai Nanda Chemical Plant | 46.2 |
| softener | naphthenic oil- | Shanghai Jinhai Special Lubricant Plant | 5 |
| anti-aging agent | anti-aging agent4010NA | Nanjing Chemical Plant | 0.8 |

TABLE 10-continued

| Material | Name | Producer | proportion by weight (%) |
|---|---|---|---|
| vesicant | Vesicant OBSH | Kaifeng Dongda Chemical (Group) Ltd. | 3 |

Example 11

The components and their proportion of the leakproof and hermetically-repairing macromolecular material utilized for the preparation of the puncture-resistant bulletproof and leakproof tire (100% by weight is taken as standard): 45% elastic material, 34.8% tackifier, 4% softener, 15% bulking agent and 1.2% anti-aging agent. The aforementioned components were mixed following their proportion (shown in Table 11) at a temperature of 320° C. for 0.5 hour, then the prepared fused product was coated to the inside wall of the tire without an inner tube by knife coating (with a thickness of 8 mm) and another embodiment of the puncture-resistant bulletproof and leakproof safety tire was prepared.

TABLE 11

| Material | Name | Producer | proportion by weight (%) |
|---|---|---|---|
| elastic material | SIS | Kraton polymers | 30 |
|  | SEPS | Kraton polymers | 15 |
| tackifier | rosin milk- | Deqing Feiyan Resin Emulsion Ltd. | 20 |
|  | terpene-phenolic resin | Guangdong Yangchun City Qiaolin silvichemical Ltd. | 14.8 |
| softener | naphthenic oil | Shanghai Jinhai Special Lubricant Plant | 3 |
|  | liquid polybutadien | Jinzhou Guta District softener Plant | 1 |
| anti-aging agent | Anti-aging Agent 1010 | Ciba specialty chemicals | 1 |
|  | Anti-aging Agent 1076 | Ciba specialty chemicals | 0.2 |
| bulking agent | nanophase lime carbonate | Shanghai Gerunya Nanophase Material Ltd. | 15 |

Example 12

The components and their proportion of the leakproof and hermetically-repairing macromolecular material utilized for the preparation of the puncture-resistant bulletproof and leakproof tire (100% by weight is taken as standard): 45% elastic material, 48% tackifier, 5.3% softener, 0.7% anti-aging agent and 1% cross-linking agent. The aforementioned components were mixed following their proportion (shown in Table 12) at a temperature of 200° C. for 2 hours, then the prepared fused product was coated to the inside wall of the tire without an inner tube by high-pressure spray coating (with a thickness of 8 mm) and the puncture-resistant bulletproof and leakproof safety tire was prepared.

TABLE 12

| Material | Name | Producer | proportion by weight (%) |
|---|---|---|---|
| elastic material | SIS | Kraton polymers | 30 |
|  | native rubber | Hainan East Road Farm | 15 |
| tackifier | coumarone | Baoshan Iron & Steel | 20 |

TABLE 12-continued

| Material | Name | Producer | proportion by weight (%) |
|---|---|---|---|
|  | indene resin | Ltd. Chemical Branch |  |
|  | rosin coumarone | Guangdong Zhongye Rosin Ltd. | 28 |
| softener | DEP | Shanghai Jinwei Chemical Ltd. | 3 |
|  | aromatic oil | Jinzhou Petrochemical Ltd. | 2.3 |
| anti-aging agent | Anti-aging Agent 1076 | Ciba specialty chemicals | 0.5 |
|  | Anti-aging Agent R D | Nanjing Chemical Plant | 0.2 |
| cross-linking agent | Bakelite | Liaoning Cucurbit Island Zinc Plant | 1 |

Example 13

The components and their proportion of the leakproof and hermetically-repairing macromolecular material utilized for the preparation of the puncture-resistant bulletproof and leakproof tire (100% by weight is taken as standard): 50% elastic material, 39% tackifier, 7.5% softener, 1% vesicant, 1.5% bulking agent, 0.7% anti-aging agent and 0.3% cross-linking agent. The aforementioned components were mixed following their proportion (shown in Table 13) at a temperature of 170° C. for 3 hours, then the prepared fused product was coated to the inside wall of the tire without an inner tube by knife coating (with a thickness of 5 mm) and the puncture-resistant bulletproof and leakproof safety tire was prepared.

TABLE 13

| Material | Name | Producer | proportion by weight (%) |
|---|---|---|---|
| elastic material | SIS | Kraton polymers | 10 |
|  | native rubber | Hainan East Road Farm | 40 |
| tackifier | coumarone indene resin | Baoshan Iron & Steel Ltd. Chemical Branch | 20 |
|  | rosin coumarone | Guangdong Zhongye Rosin Ltd. | 19 |
| softener | DEP | Shanghai Jinwei Chemical Ltd. | 5 |
|  | aromatic oil | Jinzhou Petrochemical Ltd. | 2.5 |
| anti-aging agent | Anti-aging Agent 1076 | Ciba specialty chemicals | 0.3 |
|  | Anti-aging Agent R D | Nanjing Chemical Plant | 0.4 |
| bulking agent | black carbon | Shanghai Dongjian Chemical Ltd. | 1.5 |
| vesicant | Vesicant OBSH | Kaifeng Dongda Chemical (Group) Ltd. | 1 |
| cross-linking agent | zinc oxide | Liaoning Cucurbit Island Zinc Plant | 0.3 |

Example 14

The components and their proportion of the leakproof and hermetically-repairing macromolecular material utilized for the preparation of the puncture-resistant bulletproof and leakproof tire (100% by weight is taken as standard): 44.5% elastic material, 34% tackifier, 3% softener, 3% vesicant, 15% bulking agent and 0.5% anti-aging agent. The aforementioned components were mixed following their proportion (shown in Table 14) at a temperature of 190° C. for 2.5 hours, then the prepared fused product was coated to the inside wall of the tire without an inner tube by high-pressure spray coating (with a thickness of 6 mm) and the puncture-resistant bulletproof and leakproof safety tire was prepared.

TABLE 14

| Material | Name | Producer | proportion by weight (%) |
|---|---|---|---|
| elastic material | SIS | Kraton polymers | 30 |
| | native rubber | Hainan East Road Farm | 14.5 |
| tackifier | glycerol ester of rosin | Shanghai Nanda Chemical Plant | 11 |
| | glycerol ester of hydrogenated rosin | Zhuzhou Sobon Forest Chemical Ltd. | 23 |
| softener | naphthenic oil | Shanghai Jinhai Special Lubricant Plant | 1 |
| | DBP | Jinzhou Petrochemical Corporation Chemical Plant No. 2 | 2 |
| anti-aging agent | Anti-aging Agent 1010 | Ciba specialty chemicals | 0.2 |
| | Anti-aging Agent R D | Nanjing Chemical Plant | 0.3 |
| bulking agent | Riopone | China Aluminum Fabrication Ltd. Henan Branch | 15 |
| vesicant | Vesicant OBSH | Kaifeng Dongda Chemical (Group) Ltd. | 3 |

Example 15

The components and their proportion of the leakproof and hermetically-repairing macromolecular material utilized for the preparation of the puncture-resistant bulletproof and leakproof tire (100% by weight is taken as standard): 42.5% elastic material, 37.5% tackifier, 3.3% softener, 15% bulking agent, 0.7% anti-aging agent and 1% cross-linking agent. The aforementioned components were mixed following their proportion (shown in Table 15) at a temperature of 240° C. for 3 hours, then the prepared fused product was coated to the inside wall of the tire without an inner tube by knife coating (with a thickness of 8 mm) and the puncture-resistant bulletproof and leakproof safety tire was prepared.

TABLE 15

| Material | Name | Producer | proportion by weight (%) |
|---|---|---|---|
| elastic material | SBS | Kraton polymers | 35 |
| | high styrene rubber | Lanzhou Petrochemical Branch Latex Research Center | 7.5 |
| tackifier | petroleum resin | Shanghai Jinsen Petroleum Resin Ltd. | 30 |
| | rosin milk | Deqing Feiyan Resin Emulsion Ltd. | 7.5 |
| softener | DBP | Jinzhou Petrochemical Corporation Chemical Plant No. 2 | 2 |
| | DEP | Shanghai Jinwei Chemical Ltd. | 1.3 |
| anti-aging agent | Anti-aging Agent 1010 | Ciba specialty chemicals | 0.4 |
| | Anti-aging Agent 4010NA | Nanjing Chemical Plant | 0.3 |
| bulking agent | black carbon | Shanghai Dongjian Chemical Ltd. | 15 |
| cross-linking agent | zinc oxide | Liaoning Cucurbit Island Zinc Plant | 0.7 |
| | Bakelite | Shanghai Nanda Chemical Plant | 0.3 |

Example 16

The components and their proportion of the leakproof and hermetically-repairing macromolecular material utilized for the preparation of the puncture-resistant bulletproof and leakproof tire (100% by weight is taken as standard): 46.6% elastic material, 43% tackifier, 6% softener, 3% vesicant, 0.5% anti-aging agent and 0.9% cross-linking agent. The aforementioned components were mixed following their proportion (shown in Table 16) at a temperature of 180° C. for 2 hours, then the prepared fused product was coated to the inside wall of the tire without an inner tube by high-pressure spray coating (with a thickness of 2 mm) and the puncture-resistant bulletproof and leakproof safety tire was prepared.

TABLE 16

| Material | Name | Producer | proportion by weight (%) |
|---|---|---|---|
| elastic material | SIS | Kraton polymers | 30 |
| | native rubber | Hainan East Road Farm | 16.6 |
| tackifier | glycerol ester of rosin | Shanghai Nanda Chemical Plant | 40 |
| | glycerol ester of hydrogenated rosin | Zhuzhou Sobon Forest Chemical Ltd. | 3 |
| softener | naphthenic oil | Shanghai Jinhai Special Lubricant Plant | 5 |
| | DBP | Jinzhou Petrochemical Corporation Chemical Plant No. 2 | 1 |
| anti-aging agent | Anti-aging Agent 1010 | Ciba specialty chemicals | 0.8 |
| | Anti-aging Agent 4010NA | Nanjing Chemical Plant | 0.1 |
| vesicant | Vesicant OBSH | Kaifeng Dongda Chemical (Group) Ltd. | 3 |
| cross-linking agent | zinc oxide | Liaoning Cucurbit Island Zinc Plant | 0.4 |
| | Bakelite | Shanghai Nanda Chemical Plant | 0.1 |

Example 17

The components and their proportion of the leakproof and hermetically-repairing macromolecular material utilized for the preparation of the puncture-resistant bulletproof and leakproof tire (100% by weight is taken as standard): 45% elastic material, 44.5% tackifier, 4.8% softener, 0.5% vesicant, 4% bulking agent, 0.2% cross-linking agent and 1% anti-aging agent. The aforementioned components were mixed following their proportion (shown in Table 17) at a temperature of 190° C. for 2 hours, then the prepared fused product was coated to the inside wall of the tire without an inner tube by high-pressure spray coating (with a thickness of 2 mm) and the puncture-resistant bulletproof and leakproof safety tire was prepared.

TABLE 17

| Material | Name | Producer | proportion by weight (%) |
|---|---|---|---|
| elastic material | SIS | Kraton polymers | 15 |
| | SEPS | Kraton polymers | 5 |
| | SEBS | Kraton polymers | 5 |
| | SBS | Kraton polymers | 4 |

TABLE 17-continued

| Material | Name | Producer | proportion by weight (%) |
|---|---|---|---|
| | high styrene rubber | Lanzhou Petrochemical Branch Latex Research Center | 3 |
| | native rubber | Hainan East Road Farm | 7 |
| | polyisoprene rubber | Shanghai Weixin Chemical Ltd. | 6 |
| tackifier | hydrogenated rosin | Guangxi Wuzhou Sun Shine Forestry & Chemicals Ltd. | 2 |
| | glycerol ester of rosin | Shanghai Nanda Chemical Plant | 3 |
| | hydrogenated petroleum resin | Nanjing Yangzi Eastman Chemical Ltd. | 4 |
| | terpene resin | Jiangsu Dongtai Yaerda Chemical Ltd. | 2 |
| | petroleum resin | Shanghai Jinsen Petroleum Resin Ltd. | 5 |
| | rosin milk | Deqing Feiyan Resin Emulsion Ltd. | 3 |
| | petroleum resin emulsion | Tamanol polymers | 4 |
| | glycerol ester of hydrogenated rosin | Zhuzhou Sobon Forest Chemical Ltd. | 10.5 |
| | abietic acid pentaerythritol ester | Shanghai Nanda Chemical Plant | 3 |
| | terpene-phenolic resin | Guangdong Yangchun City Qiaolin silvichemical Ltd. | 2 |
| | coumarone indene resin | Baoshan Iron & Steel Ltd. Chemical Branch | 5 |
| | rosin coumarone | Guangdong Zhongye Rosin Ltd. | 1 |
| bulking agent | nanophase lime carbonate | Shanghai Gerunya Nanophase Material Ltd. | 1 |
| | quartz flour | Hebei Xuexin Mica Ltd. | 1.5 |
| | black carbonN330 | Shanghai Dongjian Chemical Ltd. | 0.5 |
| | Riopone | China Aluminum Fabrication Ltd. Henan Branch | 1 |
| anti-aging agent | Anti-aging Agent 1010 | Ciba specialty chemicals | 0.1 |
| | Anti-aging Agent 1076 | Ciba specialty chemicals | 0.2 |
| | Anti-aging Agent R D | Nanjing Chemical Plant | 0.5 |
| | Anti-aging Agent 4010NA | Nanjing Chemical Plant | 0.2 |
| softener | naphthenic oil | Shanghai Jinhai Special Lubricant Plant | 0.7 |
| | DBP | Jinzhou Petrochemical Corporation Chemical Plant No. 2 | 1.3 |
| | DEP | Shanghai Jinwei Chemical Ltd. | 1 |
| | aromatic oil | Jinzhou Petrochemical Ltd. | 0.9 |
| | liquid polybutadien | Jinzhou Guta District softener Plant | 0.9 |
| vesicant | Vesicant OBSH | Kaifeng Dongda Chemical (Group) Ltd. | 0.5 |
| cross-linking agent | zinc oxide | Liaoning Cucurbit Island Zinc Plant | 0.1 |
| | Bakelite | Shanghai Nanda Chemical Plant | 0.1 |

In these examples, in addition to the preparation of the leakproof and hermetically-repairing macromolecular material, the preparation of the puncture-resistant bulletproof and leakproof safety tire included the following steps: wash the half-finished master tire at a medium temperature to make the inside wall of the master tire satisfy the cohesion requirement of spray coating; then put the master tire into a drying room or drying channel at a constant temperature of about 50° C. to about 80° C. for about 2 to about 8 hours according to the different kinds of the tires. Following this process, the tire can stretch evenly, the shrinkage of tire caused by the large temperature difference between the tire and the colloid while spraying the colloid can be reduced, and the cohesion between the tire and the colloid can be enhanced. Next, coat the prepared leakproof hermetically-repairing and elastic macromolecular colloid in a fused phase to the inside wall of the tire without an inner tube by high-pressure spray coating or knife coating.

Alternatively, the leakproof hermetically-repairing and elastic macromolecular colloid liquid may be cooled while spray coating. Bring the leakproof hermetically-repairing and elastic macromolecular colloid liquid of a temperature of about 160° C. to about 240° C. to the gum layer of the inside wall of the tire by gas flow of a temperature of about −30° C. through the gas flow channel in order to fast cool, solidify, and shape the colloid liquid layer adhered to the tire. When the temperature descends to about 40° C., the solidification and shape of the colloid layer is finished, and the cooling should be stopped. Thus, the puncture-resistant, bulletproof, and leakproof macromolecular composite elastic colloid can be adhered hard to the long-radius elbow tire carcass of the related part of the inside wall of the tire that does not have an inner tube.

The thickness of the seal layer exempt from repair can be controlled between about 2 mm to about 8 mm according to different requirements. The preferable range of thickness is from about 2.5 mm to about 4 mm. Too thin of a colloid layer will reduce the leakproof capability and too thick of a colloid layer will effect the weight of the tire. The thickness of the colloid layer ultimately depends on work temperature, the temperature of the colloid, equipment, cooling, and the operation of each step during the process. It is the most preferable that the colloid possesses relatively strong adhesion and caking property, and it can adhere hard to the inside wall of the controlled part of the vacuum tire.

Alternatively, on the leakproof hermetically-repairing and elastic macromolecular colloid layer, a protecting organic layer is coated thereon, which is capable of protecting the elastic colloid.

Effect Example 1

The Center for Detecting the Quality of the Digital Product for Safety and Police of China Police conducted the puncture-resistant and bulletproof capability test for the tire of this invention.

(1) Puncture-Resistant Capability Test (Steel Nail)

The tire was installed on the PaJeRo V6 3000 Type Mitsubishi Go-anywhere Vehicle. Then the vehicle rolled through a nail board where nails with a diameter of Φ4.8 mm and a protrudent length of 42 mm were set on five times at a speed of 20 Km/h. The air pressure of the tire before and after test had no difference, which satisfy the requirement.

(2) Puncture-Resistant Capability Test (Screwdriver)

The tires after the puncture-resistant capability test by steel nails were pierced with screwdrivers with a diameter of Φ8 mm or Φ6 mm and a length of 150 mm-200 mm. The air pressure of the tire before and after test had no difference, which satisfy the requirement.

(3) Bulletproof Capability Test

A tire of this invention was shot by a Type 56 7.62 mm semiautomatic rifle loaded with Type 56 7.62 mm common bullets 10 times and also shot by a Type 54 7.62 mm pistol loaded with Type 51 7.62 mm pistol bullets 5 times, both with a distance of 5 m away from the muzzle. All bullets got through the tire. Another tire was shot by a Type 54 7.62 mm pistol loaded with Type 51B 7.62 mm pistol bullets (steel core) 5 times. Before the test, the air pressure of the tires was 0.30 MPa. After shooting, the tires were installed on the V73 Type Mitsubishi Go-anywhere Vehicle immediately. Then the vehicle ran a distance of 200 km at a speed of 50 km/h on Changpin Mountain Road. After that, the air pressure of the tires was tested to be 0.30 MPa still. During the running, speedup, braking, and turning tests were conducted and the maximum speed was up to 94 km/h.

Conclusion: the puncture-resistant and bulletproof capability tests showed that the puncture-resistant bulletproof and leakproof safety tire of this invention possesses excellent puncture-resistant and bulletproof capability. After punctured by steel nails and screwdrivers or shot through by a Type 54 7.62 mm pistol and a Type 56 7.62 mm semiautomatic rifle respectively 5 times, the puncture-resistant bulletproof and leakproof tire of this invention can still run a distance more than 200 km.

Effect Example 2

China Weapon Industry Supervision Center for Detecting the Quality of the bulletproof Product concluded the puncture-resistant and bulletproof capability test for the tire of this invention.

1. Test Equipment
(1) an airborne troops and parachute troops assault Vehicle.
(2) five 245/75R16 puncture-resistant and bulletproof tires.
Four of them were for the puncture-resistant test and the other one was for the bulletproof test.
(3) two nail boards with nine nails proportionally set on with nail needlepoint up and a protrudent length of 47 mm.
type of the board: 1000×215×31 mm.
type of the: 04.7×80 mm.
(4) five screwdrivers
type of the screwdriver knifepoint: Φ5×73 mm.
(5) guns and bullets
a Type 54 7.62 mm pistol, a Type 56 7.62 mm machine rifle.
five Type 51 7.62 mm pistol bullets, five Type 56 7.62 mm common bullets.

2. Test Method
(1) Test of Rolling Nail Board for Tire:
Step 1: four 245/75R16 puncture-resistant and bulletproof tires were installed on the airborne troops and parachute troops assault Vehicle.
Step 2: two nail boards were set under the center bottom of the two front wheels of the airborne troops and parachute troops assault Vehicle.
Step 3: The vehicle was started up and rolled forward and the front and back wheels rolled over the nail boards four times.
(2) Screwdriver-puncture Test for Tire:
Step 1: after rolling nail boards several times, the four tires were pierced with five screwdrivers respectively and then the screwdrivers were pulled out.
Step 2: the tires were pierced with five screwdrivers respectively and then the screwdrivers were pulled out again and then the same action was repeated again.

(3) Bulletproof Test for Tire:
Step 1: set a tire on the proving ground with a distance of 5 m away from muzzle.
Step 2: different parts of the tire sidewall were shot by a Type 54 7.62 mm pistol loaded with Type 51 7.62 mm pistol bullets and a Type 56 7.62 mm machine rifle loaded with Type 56 7.62 mm common bullets.

3. Test Result

After the first time that the assault vehicle rolled through the nail boards, nine nails were punctured into each tire, but no gas-leakage happened; after the second time that the assault vehicle rolled over the nail boards, nine nails were punctured into each tire and two nails were broken in the tires, but no gas-leakage happened; after the third time that the assault vehicle rolled over the nail boards, eight nails were punctured into each tire and four nails were broken in the tires, but no gas-leakage happened; after the fourth time that the assault vehicle rolled over the nail boards, six nails were punctured into each tire and two nails were broken in the tires, but no gas-leakage happened.

After several times of rolling nail boards, each tire was pierced into five screwdrivers and then the screwdrivers were pulled out, and the same action was repeated twice. No gas-leakage happened.

After the two tests mentioned above, the tires were kept immobile for 4 hours, then ran 200 km. No gas-leakage happened.

After being shot by a Type 54 7.62 mm pistol and a Type 56 7.62 mm machine rifle 5 times respectively available (10 bullets, all bullets went through the back side of the tires), the tires were installed on the vehicle and kept immobile for 3 hours, then ran 200 km. No gas-leakage happened.

4. Conclusion

The puncture-resistant and bulletproof capability tests showed that the puncture-resistant bulletproof and leakproof safety tire of this invention possesses excellent puncture-resistant and bulletproof capability. After punctured by steel nails and screwdrivers or shot through by a Type 54 7.62 mm pistol and a Type 56 7.62 mm machine rifle respectively 5 times, the puncture-resistant bulletproof and leakproof tire of this method can still run for a distance more than 200 km.

Effect Example 3

Test Process

The tires of this invention were installed on the wheel hubs and filled fully with a standard pressure (3 kg/cm$^2$). One hundred (100) steel nails with a length of 80 mm and diameter of Φ5 mm were pierced into the running-side of the tires. Then the tires were put into water to test leakproof capability. After an eye test, no gas-leakage happened around any nail. Then 70 nails were pulled out. Because the nail holes were filled with colloid composite, seal colloid, leakproof layer, viscous material was brought out while pulling out nails and the high-pressure gas in the tires, no gas-leakage happened to the tires. However, 30 nails still stayed in the running side of the tires. Then the tires were installed on a vehicle, ran on the thruway at a speed of 100 km/mpn, 120 km/mp and 150 km/mpn, respectively. The vehicle ran from Shanghai to Hangzhou, then ran back. No gas-leakage happened. The tires were uninstalled from the vehicle. Another 20 steel nails were pulled out and 10 steel nails still stayed in the tires. The tires were put into water to test leakproof capability and no gas-leakage happened. The tires with 10 steel nails stayed in them were brought into a deepfreeze room in a deep refrigerator for an extra low temperature test (the minimum temperature of the deepfreeze room is about −60° C.). The gas pressure indicator was set for observation. After 12 hours of the −45° C. deepfreeze test, no gas-leakage happened according to the gas pressure indicator. After this test, the tires were brought into an oven at a temperature of about 120° C. for 3 hours. No gas-leakage happened according to the gas pressure indicator. After that, the other 10 steel nails were pulled out, and the tires were put into water for a test, no air bubbles appeared and no gas-leakage happened. On the second day, the vehicle installed with these tires ran on the thruway from Shanghai to Beijing, Zhengzhou, Xian, Baoji, Wuhan and Guangzhou at a speed of about 80 km/mpn to about 180 km/mpn. After a long distance test with a total running distance more than hundred thousands kilometers, the gas pressures of the tires were tested and remained at about 3 kg/cm$^2$.

CONCLUSION

The puncture-resistant bulletproof and leakproof safety tire of this invention possesses puncture-resistant bulletproof and leakproof capability between about −45° C. to about 120° C. After punctured, it can maintain long-distance high-speed operation and won't leak. It possesses excellent persistence and dynamic balance.

We claim:

1. The leakproof and hermetically-repairing macromolecular material for the preparation of a safety tire, comprising:
   about 45% to about 50% by weight of an elastic material;
   about 40% to about 45% by weight of a tackifier;
   about 3% to about 5% by weight of a softener;
   about 0.5% to about 1.5% by weight of an anti-aging agent;
   about 0.5% to about 1% by weight of a vesicant;
   about 1.5% to about 5% by weight of a bulking agent; and
   about 0.2% to about 0.5% by weight of a cross-linking agent.

2. The leakproof and hermetically-repairing macromolecular material according to claim 1, wherein the elastic material is selected from the group consisting of SBS thermoplastic elastomer, SIS thermoplastic elastomer, SEBS thermoplastic elastomer, SEPS thermoplastic elastomer, high styrene rubber, native rubber, and polyisoprene rubber, and mixtures thereof.

3. The leakproof and hermetically-repairing macromolecular material according to claim 1, wherein the tackifier is selected from the group consisting of terpene resin, petroleum resin, hydrogenated rosin, glycerol ester of rosin, rosin milk, petroleum resin emulsion, glycerol ester of hydrogenated rosin, abietic acid pentaerythritol ester, terpene-phenolic resin, hydrogenated petroleum resin, coumarone indene resin, and rosin coumarone, and mixtures thereof.

4. The leakproof and hermetically-repairing macromolecular material according to claim 1, wherein the anti-aging agent is selected from the group consisting of tetra-[β-(3,5-di-tert-butyl-4-hydroxyl-phenyl) propionic acid] pentaerythritol ester, β-(3,5-di-tert-butyl-4-hydroxyl-phenyl) propionic acid octadecyl ester, dimer, trimer and tetramer of 2,2,4-trimethyl-1,2-di-hydroquinoline and N-isopropyl-N'-phenyl-p-phenylenediamin, and mixtures thereof.

5. The leakproof and hermetically-repairing macromolecular material according to claim 1, wherein the softener is selected from the group consisting of naphthenic oil, aromatic oil, diethyl phthalate, dibutyl phthalate, and liquid polybutadiene, and mixtures thereof.

6. The leakproof and hermetically-repairing macromolecular material according to claim 1, wherein the bulking agent is selected from the group consisting of nanophase lime carbonate, quartz flour, black carbon, and aluminum hydroxide, and mixtures thereof.

7. The leakproof and hermetically-repairing macromolecular material according to claim 1, wherein the vesicant is 4,4'-oxybis(benzenesulfonyl hydrazide).

8. The leakproof and hermetically-repairing macromolecular material according to claim 1, wherein the cross-linking agent is at least one of zinc oxide and a phenolic resin, and mixtures thereof.

* * * * *